(12) United States Patent
Wang et al.

(10) Patent No.: US 11,026,023 B2
(45) Date of Patent: Jun. 1, 2021

(54) WIRELESS EARPHONE

(71) Applicant: MERRY ELECTRONICS (SHENZHEN) CO., LTD., Guangdong (CN)

(72) Inventors: Ko-Ming Wang, Taichung (TW); Chung-Yi Huang, Taichung (TW)

(73) Assignee: MERRY ELECTRONICS (SHENZHEN) CO., LTD., Guangdong (CN)

(*) Notice: Subject to any disclaimer, the term of this patent is extended or adjusted under 35 U.S.C. 154(b) by 1 day.

(21) Appl. No.: 16/584,922

(22) Filed: Sep. 26, 2019

(65) Prior Publication Data

US 2020/0374632 A1 Nov. 26, 2020

(30) Foreign Application Priority Data

May 20, 2019 (TW) ................. 108117381

(51) Int. Cl.
*H04R 5/033* (2006.01)
*H04M 1/05* (2006.01)
*H04M 1/60* (2006.01)

(52) U.S. Cl.
CPC ............. *H04R 5/033* (2013.01); *H04M 1/05* (2013.01); *H04M 1/6066* (2013.01)

(58) Field of Classification Search
CPC ........ H04R 5/033; H04M 1/6066; H04M 1/05
See application file for complete search history.

(56) References Cited

U.S. PATENT DOCUMENTS

| | | | |
|---|---|---|---|
| 8,989,418 B2* | 3/2015 | Dahl | H04R 1/10 381/328 |
| 2017/0295420 A1* | 10/2017 | Yeung | H04R 5/033 |
| 2018/0115839 A1* | 4/2018 | Eichfeld | H04R 5/027 |

* cited by examiner

*Primary Examiner* — Brian Ensey
(74) *Attorney, Agent, or Firm* — CKC & Partners Co., LLC

(57) ABSTRACT

A wireless earphone includes an earphone body with a concha contact surface. A sound outlet tube protrudes out from the concha contact surface. A convex positioning portion protrudes out from the concha contact surface. A laid slot is located on the concha contact surface and adjacent to the convex positioning portion. When the earphone body is mounted on a human ear, the concha contact surface is configured to face a concha of the human ear, the sound outlet tube is configured to insert into an auditory canal of the human ear, the convex positioning portion is configured to fit within a cavum of the human ear, and the laid slot is configured to fit within a crux helix of the human ear.

11 Claims, 5 Drawing Sheets

WIRELESS EARPHONE

CROSS-REFERENCE TO RELATED APPLICATION

This application claims priority to Taiwan Application Serial Number 108117381, filed May 20, 2019 which is herein incorporated by reference in its entirety.

BACKGROUND

Field of Invention

The present disclosure relates to a wireless earphone.

Description of Related Art

Conventional wireless earphones lack wires or physical designs to connect between left and right earphones to secure a wearing position. Therefore, a pair of wireless earphones is often insufficiently secured and thus easily rotated freely about a sound outlet tube of each wireless earphone. How to design a position structure that is easy to locate in a user's ear on a miniaturized wireless earphone is one of the directions developed by the manufacturer.

SUMMARY

The present invention provides a wireless earphone to deal with the needs of the prior art problems.

In one or more embodiments, a wireless earphone includes an earphone body with a concha contact surface. A sound outlet tube protrudes out from the concha contact surface. A convex positioning portion protrudes out from the concha contact surface. A laid slot is located on the concha contact surface and adjacent to the convex positioning portion. When the earphone body is mounted on a human ear, the concha contact surface is configured to face a concha of the human ear, the sound outlet tube is configured to insert into an auditory canal of the human ear, the convex positioning portion is configured to fit within a cavum of the human ear, and the laid slot is configured to fit within a crux helix of the human ear.

In one or more embodiments, the earphone body includes a speaker that divides an inner space of the earphone body into a front chamber and a rear chamber.

In one or more embodiments, the wireless earphone includes a first microphone and a second microphone both positioned inside the rear chamber of the earphone body.

In one or more embodiments, a connection line between the first and second microphones and an axis of the sound outlet tube define an included angle that ranges from about 80 degrees to about 140 degrees.

In one or more embodiments, a curvature inversion point is formed between a surface of the convex positioning portion and a surface of the laid slot.

In one or more embodiments, the sound outlet tube has a leading edge center point, a vertex of the convex positioning portion is closer to the leading edge center point than the curvature inversion point.

In one or more embodiments, the laid slot has a curved surface.

In one or more embodiments, the convex positioning portion has an arc surface having a radius of curvature smaller than that of the curved surface of the laid slot.

In one or more embodiments, the convex positioning portion substantially outlines a tapered triangle, ellipse, or tapered trapezoid.

In one or more embodiments, a horizontal width of the convex positioning portion is greater than a vertical height of the convex positioning portion when the earphone body is mounted on the human ear.

In one or more embodiments, the laid slot is a concave curved surface, a convex curved surface or a flat surface.

In sum, the wireless earphone disclosed herein can be accurately worn by the user's ear by means of a positioning relationship among the sound outlet tube, the convex positioning portion and the laid slot on the earphone body, thereby improving the stability and comfort of the wearing. When a pair of wireless earphones can be accurately positioned in the user's ear, and an included angle defined by a connection line between the wireless earphone's dual microphones and an axis of the sound outlet tube is within a limited range, it is beneficial for the dual microphones to perform well.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 2:
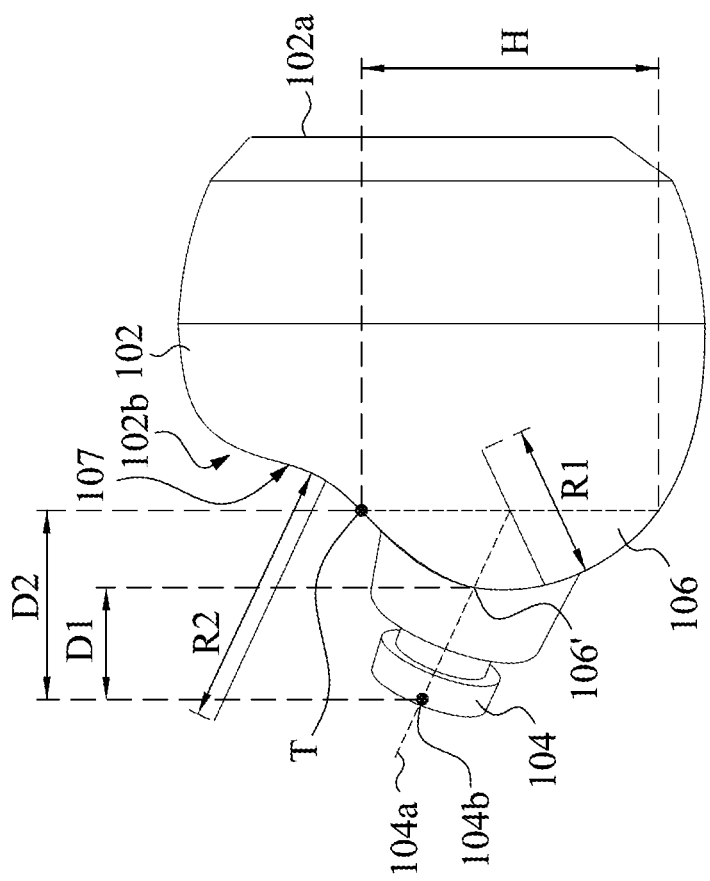
FIG. 2 illustrates another perspective view of the wireless earphone in FIG. 1.

Reference will now be made in detail to the present embodiments of the invention, examples of which are illustrated in the accompanying drawings. Wherever possible, the same reference numbers are used in the drawings and the description to refer to the same or like parts.

Figure 1:
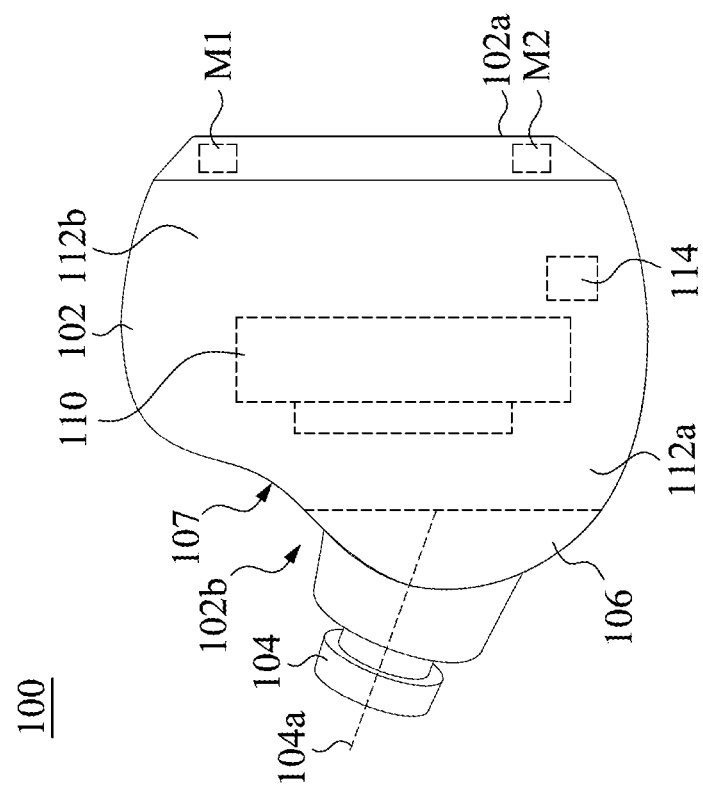
FIG. 1 illustrates a perspective view of a wireless earphone according to one embodiment of the present disclosure.
Figure 3:
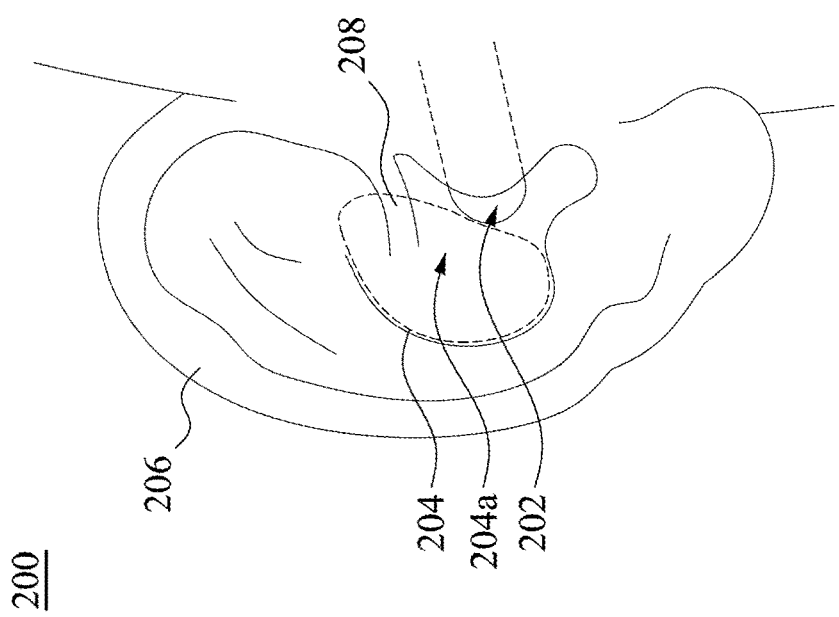
FIG. 3 illustrates a perspective view of a human auricle structure.

Reference is made to FIGS. 1-3. FIG. 1 illustrates a perspective view of a wireless earphone according to one embodiment of the present disclosure. FIG. 2 illustrates another perspective view of the wireless earphone in FIG. 1. FIG. 3 illustrates a perspective view of a human auricle structure.

A wireless earphone 100 includes an earphone body 102, a sound outlet tube 104, a convex positioning portion 106, and a laid slot 107. The earphone body 102 includes a concha contact surface 102b and an outer plane 102a that is opposite to the concha contact surface 102b. The sound outlet tube 104 protrudes from the concha contact surface 102b. The convex positioning portion 106 protrudes from the concha contact surface 102b of the earphone body 102. The laid slot 107 is also located on the concha contact surface 102b of the earphone body 102 and adjacent to the convex positioning portion 106. When the earphone body 102 is mounted or worn on a human ear, the concha contact surface 102b is configured to face the concha 204 of the user's auricle structure 200, the sound outlet tube 104 is configured to insert the user's auditory canal 202, and the convex positioning portion 106 is configured to fit within the user's cavum 204a, the laid slot 107 is configured to fit within or contact a crux helix 208 of the user's helix 206 such that each wireless earphone can be accurately positioned in the user's auricle structure, and not easily rotated relative to the auditing canal 202, and comfort of wearing is also improved.

In this embodiment (referring to FIG. 1), the earphone body 102 includes a speaker 110 that divides an inner space of the earphone body 102 into a front chamber 112a and a rear chamber 112b, and the first microphone M1 and the second microphone M2 are both located in the rear chamber 112b of the earphone body 102. The earphone body 102 includes a wireless communication module 114 (e. g, a Bluetooth communication module) located in the rear chamber 112b of the earphone body 102 to communicate and operate with other electronic devices with corresponding wireless communication modules.

In this embodiment (referring to FIG. 2), a curvature inversion point T is formed between an outer surface of the convex alignment portion 106 and an outer surface of the laid slot 107. The sound outlet tube 104 has a leading edge center point 104b. A distance between the vertex 106' of the convex positioning portion 106 and the leading edge center point 104b is D1. A distance between the curvature inversion point T and the leading edge center point 104b is D2, and D1 is smaller than D2. In other words, the vertex 106' of the convex alignment portion 106 is closer to the leading edge center point 104b of the sound outlet tube 104 than the curvature inversion point T.

In this embodiment (referring to FIG. 2), the laid slot 107 has a concave curved surface with a radius of curvature R2. The convex positioning portion 106 has a convex curved surface with a radius of curvature R1 that is smaller than the radius of curvature R2 of the curved surface of the laid slot 107, but is not limited thereto.

Figure 4:
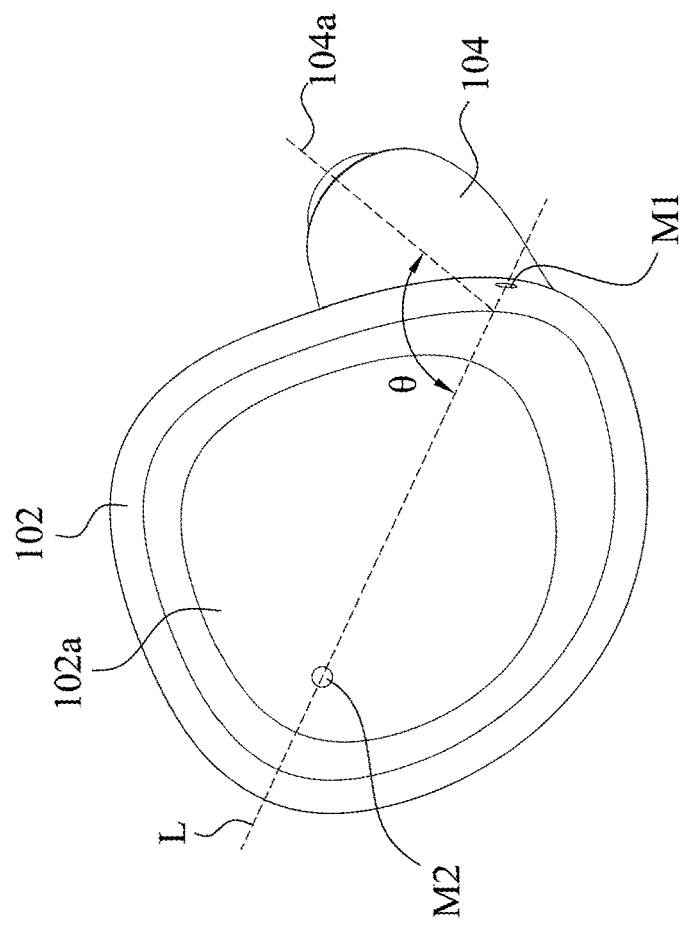
FIG. 4 illustrates another perspective view of the wireless earphone in FIG. 2 from another view point.

Reference is made to FIG. 4, which illustrates another perspective view of the wireless earphone in FIG. 2 from another view point (i.e., viewed from the outer plane 102a of the wireless earphone). In this embodiment, an included angle θ is defined by a connection line L between the first and second microphones (M1, M2) and an axis line 104a of the sound outlet tube 104, and the include angle θ ranges from about 80 degrees to about 140 degrees. The preferred angle is about 110 degrees. When the wireless earphone is accurately positioned in the user's ear as described above, and the angle θ is defined by the connection line L between the first and second microphones (M1, M2) and the axis line 104a of the sound outlet tube 104 ranges between 80 degrees and 140 degrees, it is beneficial for the dual microphones to exert good acoustic performance. For example, when the angle θ defined by the connection line L between the first and second microphones (M1, M2) and the axis line 104a of the sound outlet tube 104 is 110 degrees, the connection line L will extend to the wearer's mouth, which will facilitate an accurate sound receiving for the first microphone M1 and the second microphone M2.

Figure 5:
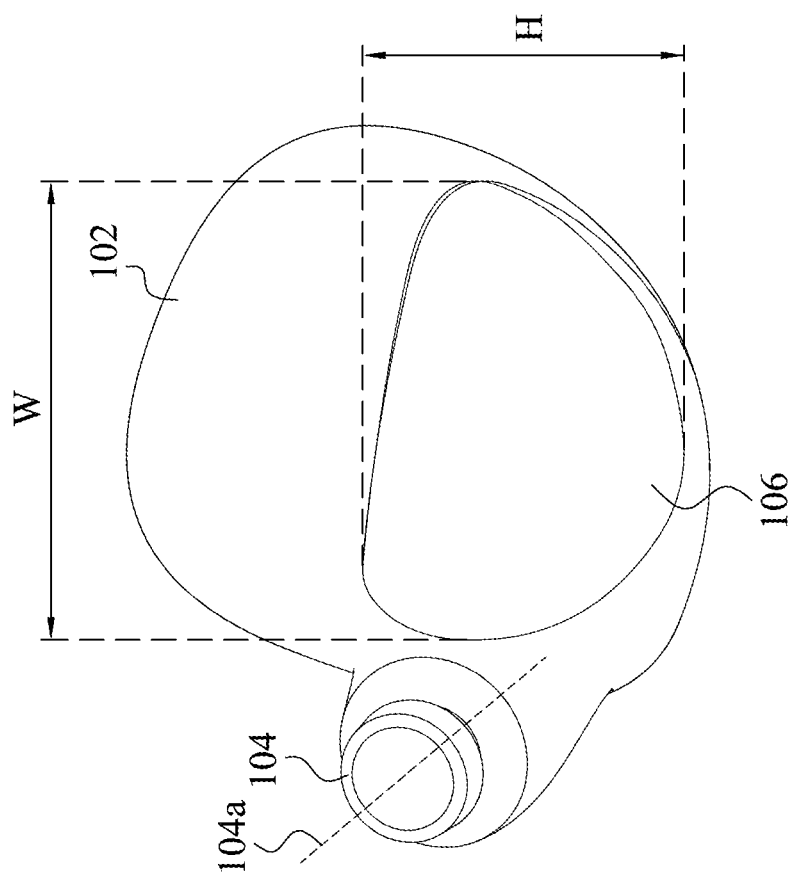
FIG. 5 illustrates still another perspective view of the wireless earphone in FIG. 2 from still another view point.

Reference is made to FIG. 5, which illustrates still another perspective view of the wireless earphone in FIG. 2 from still another view point (i.e., viewed from the convex positioning portion 106 of the wireless earphone). In this embodiment, when the earphone body 102 is worn on the user's ear, the convex positioning portion 106 has its horizontal width W greater than its vertical height H, and the convex positioning portion 106 substantially outlines a tapered triangle.

Reference is made to FIGS. 6-9, which illustrate side views of wireless earphones according to other embodiments of the present disclosure.

Figure 6:
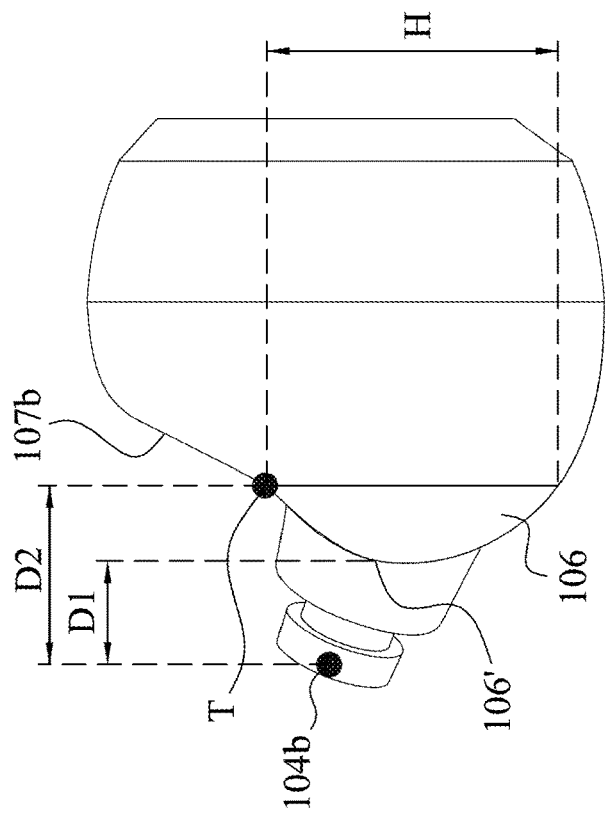

The embodiment in FIG. 6 is different from the previous embodiments in that the laid slot 107b has a flat outer surface, and a curvature inversion point T is formed between an outer surface of the convex positioning portion 106 and the flat outer surface of the laid slot 107b. Similar to the previous embodiments, the vertex 106' of the convex positioning portion 106 is closer to the leading edge center point 104b of the sound outlet tube 104 than the curvature inversion point T.

Figure 7:
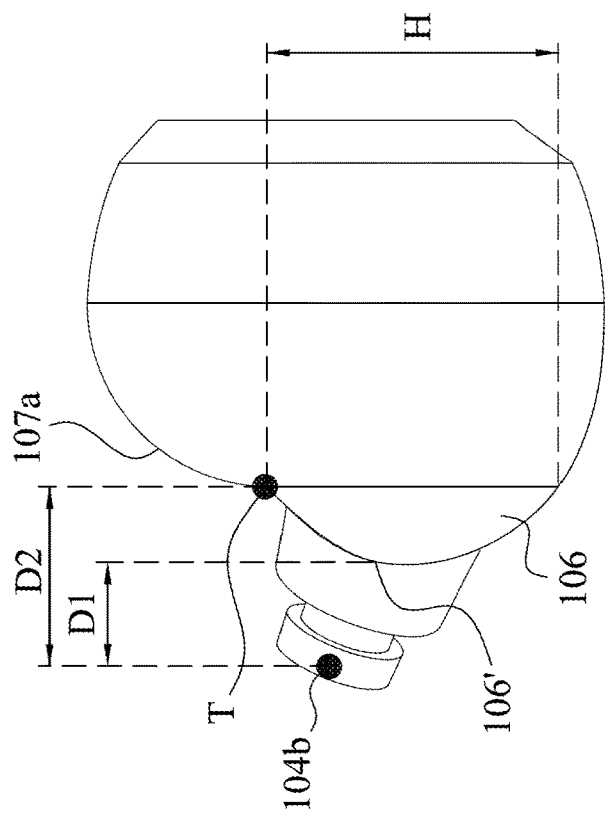
FIGS. 6-9 illustrate side views of wireless earphones according to other embodiments of the present disclosure.

The embodiment in FIG. 7 is different from the previous embodiments in that the laid slot 107a has a convex curved surface, and a curvature inversion point T is formed between an outer surface of the convex positioning portion 106 and the convex curved surface of the laid slot 107a. Similar to the previous embodiments, the vertex 106' of the convex positioning portion 106 is closer to the leading edge center point 104b of the sound outlet tube 104 than the curvature inversion point T.

Figure 8:
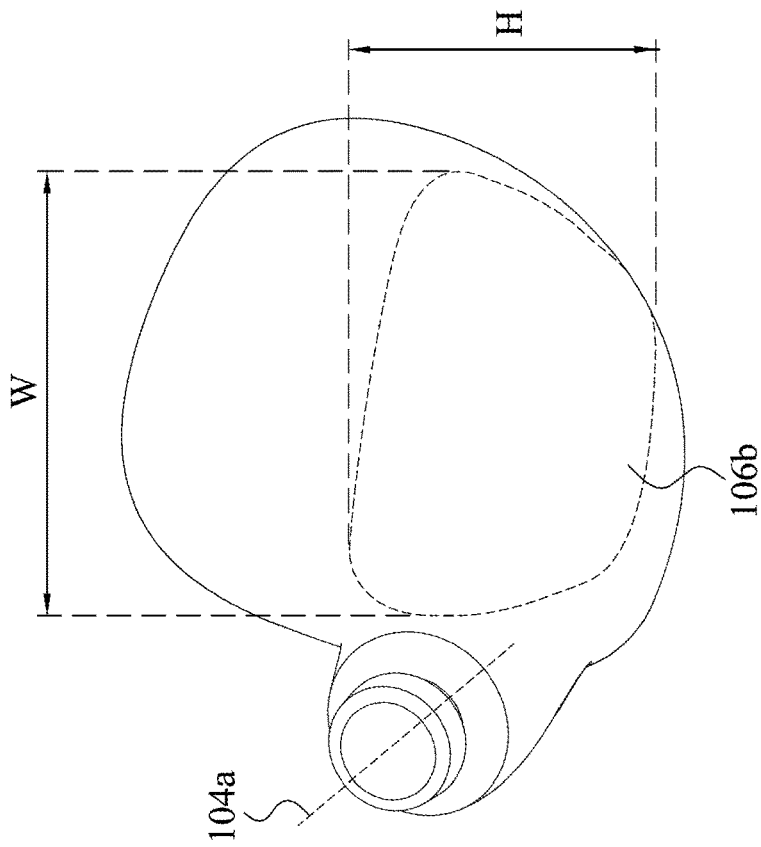

The embodiment in FIG. 8 is different from the previous embodiments in that the convex positioning portion 106b substantially outlines a tapered trapezoid, and its horizontal width W is greater than its vertical height H.

Figure 9:
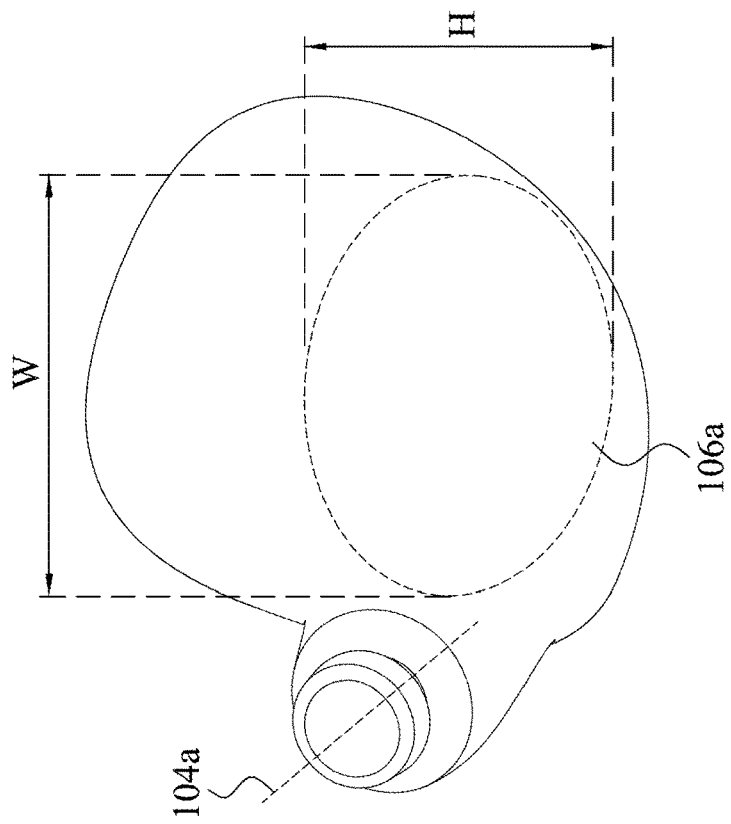

The embodiment in FIG. 9 is different from the previous embodiments in that the convex positioning portion 106a substantially outlines an ellipse, and its horizontal width W is greater than its vertical height H.

In sum, the wireless earphone disclosed herein can be accurately worn by the user's ear by means of a positioning relationship among the sound outlet tube, the convex positioning portion and the laid slot on the earphone body, thereby improving the stability and comfort of the wearing. When a pair of wireless earphones can be accurately positioned in the user's ear, and an included angle defined by a connection line between the wireless earphone's dual microphones and an axis of the sound outlet tube is within a limited range, it is beneficial for the dual microphones to perform well.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless earphone comprising:
    an earphone body having a concha contact surface;
    a sound outlet tube protruding from the concha contact surface;
    a convex positioning portion protruding from the concha contact surface; and
    a laid slot disposed on the concha contact surface and adjacent to the convex positioning portion, when the earphone body is mounted on a human ear, the concha contact surface is configured to face a concha of the human ear, the sound outlet tube is configured to insert into an auditory canal of the human ear, the convex positioning portion is configured to fit within a cavum of the human ear, and the laid slot is configured to fit within a crux helix of the human ear.

2. The wireless earphone of claim 1, wherein the earphone body comprises a speaker that divides an inner space of the earphone body into a front chamber and a rear chamber.

3. The wireless earphone of claim 2, further comprising a first microphone and a second microphone both disposed inside the rear chamber of the earphone body.

4. The wireless earphone of claim 3, wherein a connection line between the first and second microphones and an axis of the sound outlet tube define an included angle that ranges from about 80 degrees to about 140 degrees.

5. The wireless earphone of claim 1, wherein a curvature inversion point is formed between a surface of the convex positioning portion and a surface of the laid slot.

6. The wireless earphone of claim 5, wherein the sound outlet tube has a leading edge center point, a vertex of the convex positioning portion is closer to the leading edge center point than the curvature inversion point.

7. The wireless earphone of claim 1, wherein the laid slot has a curved surface.

8. The wireless earphone of claim 7, wherein the convex positioning portion comprises an arc surface having a radius of curvature smaller than that of the curved surface of the laid slot.

9. The wireless earphone of claim 1, wherein the convex positioning portion substantially outlines a tapered triangle, ellipse, or tapered trapezoid.

10. The wireless earphone of claim 1, wherein a horizontal width of the convex positioning portion is greater than a vertical height of the convex positioning portion when the earphone body is mounted on the human ear.

11. The wireless earphone of claim 1, wherein the laid slot comprises a concave curved surface, a convex curved surface or a flat surface.

* * * * *